United States Patent [19]

Diehl et al.

[11] 4,030,062
[45] June 14, 1977

[54] DIRECTION DETERMINATION IN SONAR SYSTEMS

[75] Inventors: Reiner Diehl; Margitta Lütkemeyer-Hohmann, both of Bremen, Germany

[73] Assignee: Fried, Krupp Gesellschaft mit beschränkter Haftung, Essen, Germany

[22] Filed: Dec. 10, 1975

[21] Appl. No.: 639,603

[30] Foreign Application Priority Data

Dec. 14, 1974 Germany .................. 2459219

[52] U.S. Cl. .................. 340/3 R; 340/6 R
[51] Int. Cl.² .................. G01S 9/66; G01S 3/80
[58] Field of Search .................. 340/3 R, 6 R

[56] References Cited

UNITED STATES PATENTS 3,835,448  9/1974  Bertheas .................. 340/6 R
3,967,233  6/1976  Maguer et al. .................. 340/3 R

*Primary Examiner*—Richard A. Farley
*Attorney, Agent, or Firm*—Spencer & Kaye

[57] ABSTRACT

In a procedure for determining the direction of echo signal pulses in a medium by means of a close range sonar system having at least one linear array of electroacoustic transducers and presenting a wide aperture angle and high azimuth and radial resolution, accurate determinations are made at a reduced component cost by: dividing the total aperture angle into a plurality of partial regions each having a respective median direction and an aperture angle $$\alpha \leq \frac{c}{D \cdot B},$$

where $c$ is the speed of sound in the medium, $D$ is the length of the transducer array, and $B$ is the bandwidth of the emitted signal pulses; subjecting the received signals associated with each partial region to a delay time compensation corresponding to its associated median direction; scanning the signals received by successive units of the transducers of said array at a selected frequency $f_{s'}$; intermediately storing the scanned signals; sampling successive ones of the intermediately stored signals at a sampling frequency $f_s$ to form a serial signal; and phase compensating the resulting serial signal to produce a direction indication.

7 Claims, 13 Drawing Figures

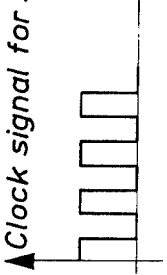
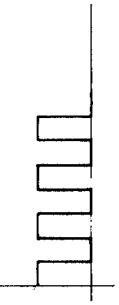

DIRECTION DETERMINATION IN SONAR SYSTEMS

BACKGROUND OF THE INVENTION

The present invention relates to a direction determining method and apparatus for close-range sonar systems having a wide aperture angle and high azimuth and radial resolution. In the case of short pulses, the radial resolution is defined as c/2B, where c is the sound velocity in the medium and B is the pulse bandwidth.

In systems of this type, it is common to employ an arrangement of spatially arranged acoustic-electric transducers to determine the direction of incidence of sonar signals. While this procedure basically serves for the determination of a direction in one plane, it can also be used for the determination of a direction in two planes.

It is known to determine the direction of incidence of sonar echoes by providing a staggered time delay of the electrical signals from the individual transducer groups and adding these signals in the correct phase relation. The sum signal is a measure for the echo amplitude from a certain direction of incidence, the particular direction being determined by the selection of the delay times. If this method is used for a plurality of directions, it is called beam scanning.

It is also known to simplify this principle by employing a phase shift to correspond to the delay times, a process which is briefly called phase compensation.

Since in addition to the direction of incidence, the distance, or range, of the reflecting object is also to be determined, the emitted pulses have a finite duration and a predetermined bandwidth. A phase compensation will then, however, reach its limits. In sonar devices for close ranges it is generally necessary to have a high distance resolution, a wide angle resolution and a wide aperture angle. Phase compensation is permissible only for the region $$\alpha_o \leq \frac{c}{D \cdot B},$$

where $\alpha_o/2$ is the maximum angle between the normal to the transducer array and an object point, c is the speed of sound, D is the length of the transducer array and B is the pulse bandwidth.

Phase compensation for a plurality of receiving directions can be realized for distant targets with a Fourier transformation of the received signals from the individual groups of transducers $u_n$ and for the short-range field with an additional multiplication by a phase factor, as described in the publication Acoustical Holography, Vol. 2, pages 136, 137, Plenum Press, 1970. Such a discrete Fourier transformation can be effected electrically. Alternatively, it can be effected optically in a holographic process. The equipment costs for this are substantially less than for an exact delay time compensation system.

SUMMARY OF THE INVENTION

It is an object of the present invention to effect direction determinations in connection with a wide aperture angle in a close-range sonar system while permitting the Fourier transformation to be used for aperture angles which are greater than $$\alpha_o = \frac{c}{D \cdot B}$$

This and other objects of the invention are accomplished by dividing the total aperture angle $\alpha_o$ into K partial sections each with an aperture angle $$\alpha \leq \frac{c}{D \cdot B},$$

and by subjecting these partial sections to delay time compensation corresponding to K main directions, the received voltages being scanned with a frequency $f_s,$ and put into intermediate storage, converting the intermediately stored signals, with the aid of a multiplexer, to a serial signal at frequency $f_s,$ and using this serial signal, with the aid of phase compensation, to determine the direction.

The received signals $u_n$ from the individual transducers or groups of transducers $(n = 1, \ldots, N)$ must, according to sampling theorem, be scanned in the real domain with a frequency 2B or in the complex domain with a frequency B. Since all N transducers must be scanned during a time 1/2B or 1/B, respectively, there results, for sequential processing, the scanning frequency:

$f_s \geq N \cdot B$ (complex processing)

$f_s \geq 2N \cdot B$ (real processing)

Usually 1.5 times the value of the lower limit is selected. Since the individual transducers are scanned in sequence, there results a linear delay of the individual signals which corresponds to a receiving direction $\beta$. The angle $\beta$ is defined by:

$$\sin \beta = \frac{N \cdot c}{D \cdot f_s}$$

where $f_s$ is the now actually employed scanning frequency. By reversing the scanning sequence, the receiving direction $-\beta$ can be produced. Since the values N, D and $f_s$ are already determined, it is not possible to arbitrarily select a value for the angle $\beta$ in the above-described manner.

However, the present invention provides a method which — within certain limits — permits arbitrary selection of the main receiving directions $\beta_k$ ($k = 1, 2, \ldots K$).

First consider the case:

$$|\beta| \leq \frac{N \cdot c}{D \cdot f_s}$$

Here it is sufficient to scan the received voltages with a correspondingly higher frequency $f_s,$ and to intermediately store the respective scanned value temporarily with the aid of a circuit which is known as a sample-and-hold circuit. The stored signals are then converted, at frequency $f_s$ and with the aid of a multiplexer, to a serial signal. This will be described below with reference to FIG. 3 and FIG. 4.

The maximum required holding period for the sample-and-hold device is $$\frac{N}{f_s} - \frac{N}{f_{s'}}.$$

In order to obtain an angle $\beta \leq 0$, it is merely necessary to reverse the sequence with which the individual sample-and-hold circuits as well as the electronic switches disposed in the multiplexer are addressed.

Now consider the case:

$$\frac{N \cdot c}{D \cdot f_s} \leq |\beta| \leq \frac{2N \cdot c}{D \cdot f_s}$$

This case requires a scanning frequency $f_{s'} \leq f_s$ which will no longer satisfy the sampling theorem criteria. According to the present invention, this problem is solved in that the voltages $u_n$ applied to the individual transducers or groups of transducers are scanned in the sequence $u_n, u_{n+M}, u_{n+1}, u_{n+M+1}, \ldots$ etc. and are stored intermediately, as will be described below with reference to FIG. 5, M being the next whole number beyond $$N \frac{f_{s'}}{f_s}.$$

The maximum holding period for the sample-and-hold device is $N/f_s$.

The scanning instructions for other increments of angle $\beta$ can be derived analogously to the case illustrated here. The negative angles are produced by reversing the scanning sequence.

With the delay time compensation of $k$ main directions as provided by the present invention the same effect is obtained as if the transducer array were rotated in the directions $\beta_k$.

A further concept of the present invention relates to the elimination of echo signals received from an angular region $$\gamma \geq |\beta_k \pm \frac{\alpha}{2}|.$$

Multiplexing N received voltages $u_1, \ldots u_N$ produces a single serial signal which consists of a frequency mixture. The frequencies $f$ occurring in this mixture are linked to the angular region of incidence $\gamma$ by the relationship $$f = \frac{D \cdot f_s \cdot \sin \gamma}{\lambda \cdot N}$$

where $\lambda$ is the wavelength of the reflected sound signal.

With the time-dependent filtering of the sequential signal, the angular regions which are not required are filtered out. For each individual angular region $k$ ($k = 1, 2, \ldots, K$), this is realized with the aid of a bandpass filter which has the transmission range $$\frac{D \cdot f_s \cdot \sin\left(\beta_k - \frac{\alpha}{2}\right)}{\lambda \cdot N} \leq f \leq \frac{D \cdot f_s \cdot \sin\left(\beta_k + \frac{\alpha}{2}\right)}{\lambda \cdot N}$$

Processing of $k$ angular regions requires $k$ parallel channels. The increased equipment costs resulting from this can be avoided if the individual angular regions are processed in sequence during $K$ ranging periods. This mode of operation is possible at close range since the ranging period duration is short.

Further processing of the serial signal is effected in a known manner by Fourier transformation and, if operation takes place at close range, by subsequent multiplication by a phase factor which effects focusing. A representation of the thus resulting video signal is displayed on a viewing device.

The advantages obtained with the present invention are that the delay time compensation is replaced by the Fourier transformation and thus costs are correspondingly reduced. Matching the scanning frequency of the sample-and-hold stage with the scanning frequency of the multiplexer permits, within certain limits, arbitrary selection of the main receiving directions $\beta_K$ ($k = 1, 2, \ldots, K$). A further advantage is the possibility of cutting out angular regions which are not required by means of time dependent filtering.

BRIEF DESCRIPTION OF THE DRAWINGS

FIGS. 6c and 6d are switching diagrams of the operation of switches 4 and 9 of FIG. 3.

DESCRIPTION OF THE PREFERRED EMBODIMENTS

Figure 1:
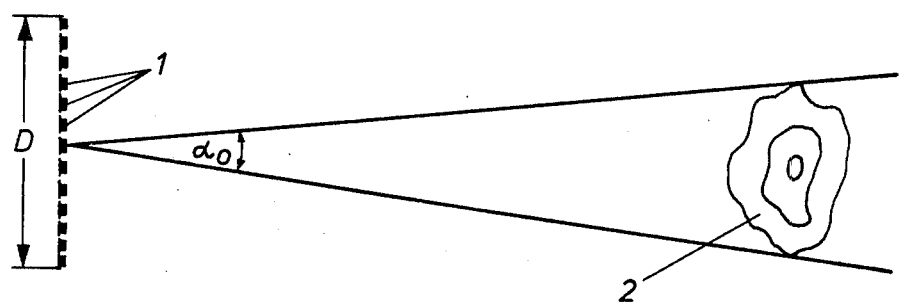
FIG. 1 is a diagram used in explaining the principles of the present invention.

FIG. 1 illustrates the basic geometric relationships involved in the operation of a system of the type to which the invention relates. Each one of the transducers or groups of transducers 1, respectively, is excited by a sound pulse reflected from an object 2. The total aperture angle $\alpha_o$ can be divided into K partial regions each with the aperture angle $$\alpha = \frac{c}{D \cdot B},$$

where c is the speed of sound, D is the length of transducer array 1 and B the pulse bandwidth.

Figure 2:
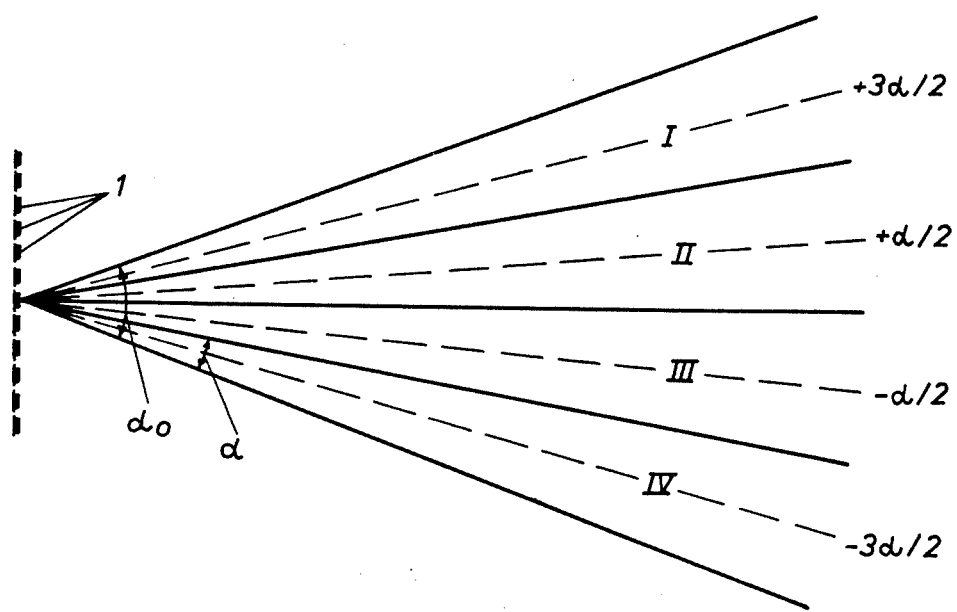
FIG. 2 is a second view used in explaining the principles of the invention.

For each individual one of these K partial regions it is necessary to effect a delay time compensation in the central direction of the region. This is shown, for example, in FIG. 2. The total aperture angle $\alpha_o$ is divided into 4 partial regions I through IV, each subtending an angle $\alpha$. The receiving base angle, or median angle, $$\pm \frac{\alpha}{2} \text{ or } \pm \frac{3\alpha}{2},$$

for the central directions of regions I through IV is accurately delay time compensated. The receiving directions therebetween can then be determined with sufficient accuracy by means of a phase compensation.

Delay time compensation for the central directions of the K partial regions is obtained according to the present invention by utilizing the linear delay effect occurring during sequential scanning of the individual transducers. For this purpose the the signal voltages $u_n$, where $n = 1, \ldots N$, of the individual transducers or groups of transducers are scanned on a real basis at least with a frequency 2B or on a complex basis with a frequency B according to sampling theorem. This results in a scanning frequency for all N transducers scanned during the time 1/2B or 1/B, respectively, for sequential processing of $$f_s \geq N \cdot B$$

for complex domain processing, and of $$f_s \geq 2N \cdot B$$

for real domain processing.

Usually 1.5 times the value of the lower limit is selected. The individual transducers are scanned in sequence. This results in a linear delay of the individual signals. This linear delay corresponds to a receiving direction $\beta$ whose value can be determined, if $f_s$ is now the actual scanning frequency, from:

$$\sin \beta = \frac{N \cdot c}{D \cdot f_s}$$

$\beta$ becomes $-\beta$ if the scanning sequence is reversed. Since the values N, D and $f_s$ are already determined, it is not possible to select the value for angle $\beta$ at will in this manner.

According to one concept of the invention, it becomes possible to select the values for the main directions $\beta_k$ (k=1, 2, 3, ..., K) within certain limits. If $$|\beta| \leq \frac{N \cdot c}{D \cdot f_s}$$

is set as the further region of the main receiving direction $\beta_k$ (k = 1, 2, ..., K), it is sufficient to scan the received voltages at a correspondingly higher frequency $f_{s'}$ and to intermediately store the respective scanned value for a short period of time.

Figure 3:
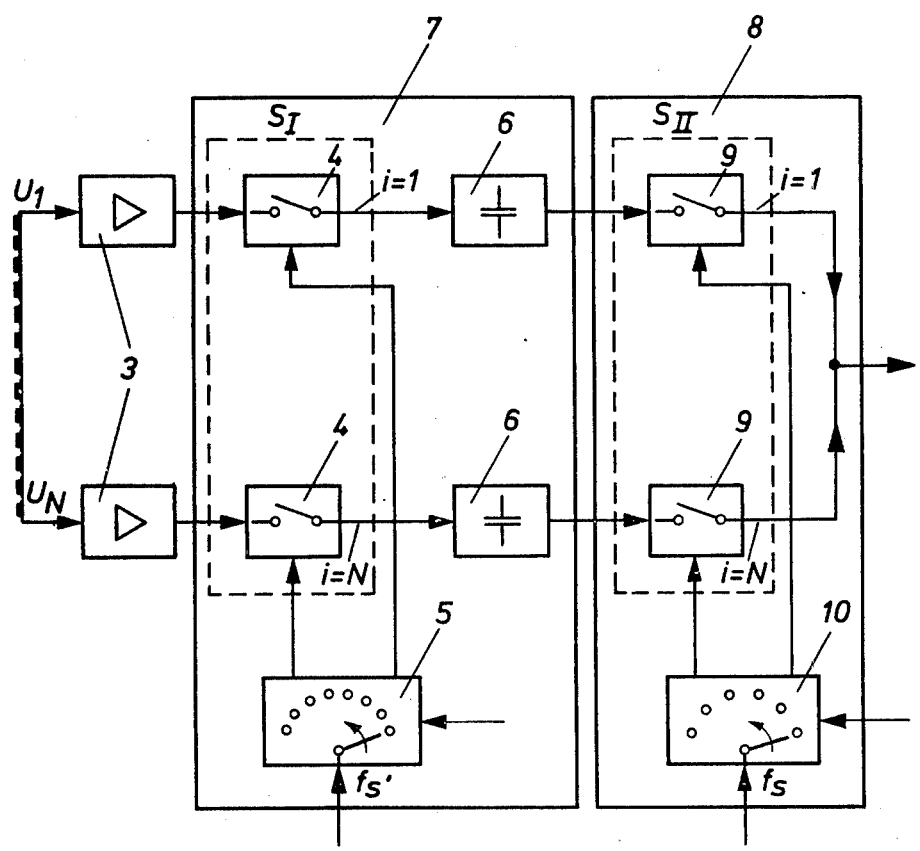
FIG. 3 is a circuit diagram of a circuit according to the invention for converting the transducer signals $u_1, \ldots, u_N$ into a serial signal with simultaneous delay time compensation.

With the aid of a multiplexer, such as that illustrated in FIG. 3, the stored signals are converted, at frequency $f_{s'}$ to a serial signal.

The signal voltages $u_n$ ($n = 1, 2, \ldots, N$) coming from successive transducers or groups of transducers 1 are initially preamplified in respective amplifiers 3. One amplifier is provided for each transducer or transducer group, although only two such amplifiers are shown. The same is true for the subsequent signal processing circuitry. Each amplifier supplies its output to a respective electronic switch 4 and all of the switches 4 are connected to a stepping switch 5 which closes each switch 4 in succession at a switching frequency of $f_{s'}$, i.e., the period between switching steps is $1/f_{s'}$ second. Each switch 4 connects its respective amplifier 3 to a memory element, e.g., a capacitor, 6.

Elements 4, 5 and 6 constitute a sample-and-hold circuit 7 for the in-phase cmponents of the received signals. Circuit 7 supplies the stored signals to a multiplexer 8 for the in-phase signal components. Multiplexer 8 is composed of a plurality of electronic switches 9, each connected to a respective one of the memory elements 6, and a stepping switch 10 connected to close each switch 9 in succession. All of the outputs of switches 9 are connected to form a common output. Switch 10 operates at a cycle rate of $f_s$ to convert the signal stored in the sample-and-hold circuit 7 into a serial signal at the output of circuit 8.

Figure 4:
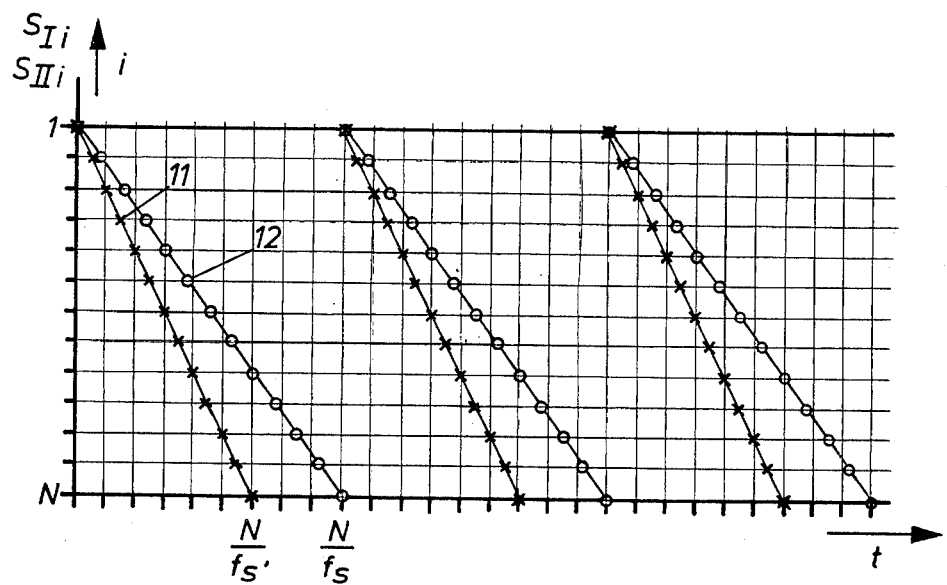
FIG. 4 is a scanning diagram corresponding to the direction of incidence $$\beta = \frac{N \cdot c}{d \cdot f_s}$$

The sequence of signal components in the output from circuit 8 is illustrated in FIG. 4. The maximum holding period in sample-and-hold circuit 7 for the in-phase component is $$\frac{N}{f_s} - \frac{N}{f_{s'}}.$$

The crosses 11 depict the switching moments of the sample-and-hold unit 7. The circles 12 depict the switching moments of the multiplexer 8.

If angle $\beta \leq 0$ is desired, it is only necessary to reverse the scanning sequence for the multiplexer.

For receiving directions $\beta$ for which $$\frac{N \cdot c}{D \cdot f_s} \leq |\beta| \leq \frac{2N \cdot c}{D \cdot f_s} \text{ applies,}$$

the circuit arrangement is the same as in the region $$\sin \beta = \frac{N \cdot c}{D \cdot f_s}.$$

However, the scanning frequency is now $f_{s'} \leq f_s$.

Figure 5:
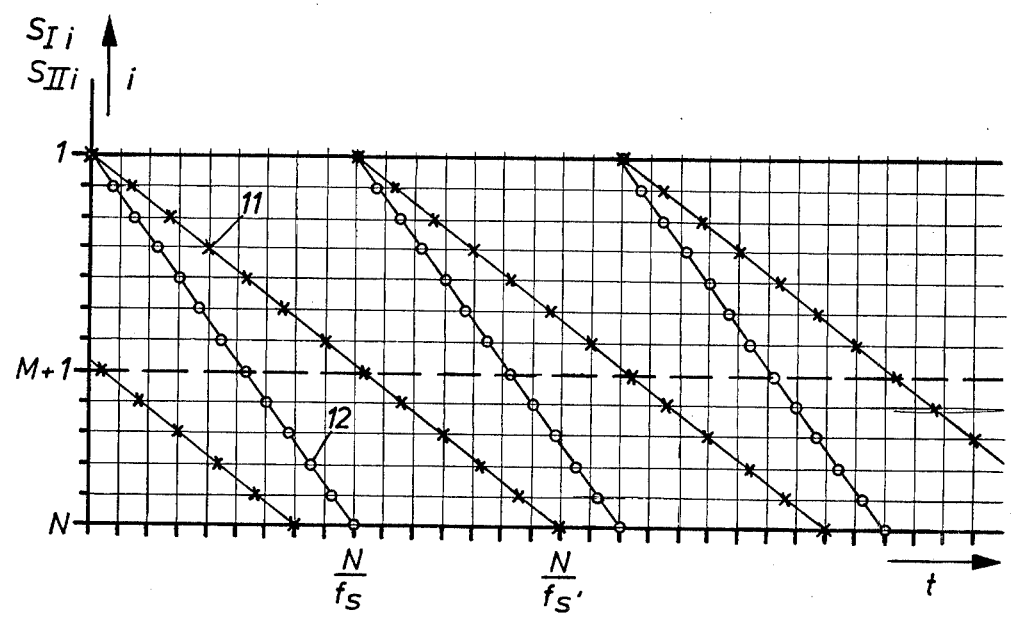
FIG. 5 is a scanning diagram corresponding to the direction of incidence $$\frac{N \cdot c}{D \cdot f_s} \leq |\beta| \leq \frac{2N \cdot c}{D \cdot f_s}$$

Then the scanning frequency for the sample-and-hold device no longer meets the sampling theorem criteria. For this reason two scanning periods now overlap. FIG. 5 shows the corresponding scanning diagram. The scanning sequence is $u_n, u_{n+M}, u_{n+1}, u_{n+M+1}, \ldots$ In this case M is the next whole number above $$N \frac{f_{s'}}{f_s}.$$

The maximum holding period for the sample-and-hold circuit is $N/f_s$. In this way the scanning requirement for further portions of angle $\beta$ can be derived. Reversal of the scanning sequence results in negative angle values.

The delay time compensation as provided by the present invention for K main directions results in the same phenomena as if the transducer base were rotated by $\beta_k$. Echo signals received from an angular region $$\gamma > |\beta_k \pm \frac{\alpha}{2}|$$

must be eliminated. The frequency $f$ of the sequential signal at the output of multiplexer 8 for the in-phase component is related to the angle of incidence by $$f = \frac{D \cdot f_s \cdot \sin\gamma}{\lambda \cdot N}.$$

The angular regions which are not required are thus cut out by time-dependent filtering of the sequential signal. For this purpose, a bandfilter with the transmission range $$\frac{D \cdot f_s \cdot \sin\left(\beta_k - \frac{\alpha}{2}\right)}{\lambda \cdot N} \leq f \leq \frac{D \cdot f_s \cdot \sin\left(\beta_k + \frac{\alpha}{2}\right)}{\lambda \cdot N}$$

is required for each individual angle $k$ (1, 2, ..., K).

Processing of K angular regions requires K parallel channels. That means increased component costs. However, the individual angular regions can be processed in succession during K ranging periods. This is possible only, however, in close-range operation when the ranging periods are of short duration.

Signal processing of a close range sonar is described with reference to the circuit shown in FIG. 6 which illustrates the apparatus required for this purpose. The following parameters are applicable to the illustrated embodiment:

| | |
|---|---|
| Total aperture angle | $\alpha_o = 40°$ |
| Number of partial regions | K = 4 |
| Extent of each partial region | $\alpha = 10°$ |
| Bandwidth of the transmitted or received signal | B = 75kHz |
| Transducer base length | D = 75mm |
| Center frequency of transmitted signals | $f_o$ = 2MHz |
| Number of transducers or groups of transducers | N = 100 |
| Scanning frequency of multiplexer (complex scanning) | $f_s$ = 11.25MHz |
| | $f_s$ = 22.64MHz(5°) |
| | $f_s$ = 7.62MHz(15°) |

The signal voltages $u_n$ ($n = 1, 2, \ldots, 100$) from the transducers or groups of transducers, respectively, in this case N = 100 transducers or groups of transducers, are fed to amplifiers 3. From the amplifiers, they enter the sample-and-hold circuit 7 for the in-phase component and the sample-and-hold circuit 70 for the quadrature component, the two sample-and-hold circuits being controlled by signals from a clock pulse generator 15 producing clock pulse signals at frequency $f_{s'}$. From circuits 7 and 70, the signals are scanned and stored.

Sample-and-hold circuit 7 processes the in-phase component and circuit 70 to the quadrature component as described in Grace and Pitt, *Sampling and Interpolation of Bandlimited Signals by Quadrature Methods*, The Journal of the Acoustic Society of America, Vol. 48, No. 6 (Part I), 1970, at pages 1311–1318. The quadrature component is obtained by means of a clock pulse signal at frequency $f_{s'}$, which is delayed by 125 ns in a delaying member 13 to produce the quadrature component and which controls sample-and-hold circuit 70 for the quadrature component. Thereafter, the stored signals are read out by a multiplexer 8 for the in-phase component and a multiplexer 80 for the quadrature component and are converted to a serial signal.

Multiplexer 8 for the in-phase component is controlled by a clock pulse signal at frequency $f_s$ = 11.25MHz and multiplexer 80 for the quadrature component is controlled by a clock pulse signal at the same frequency $f_s$ which has been delayed by 125 ns by a further delaying member 14 to produce the quadrature component.

Figure 7:
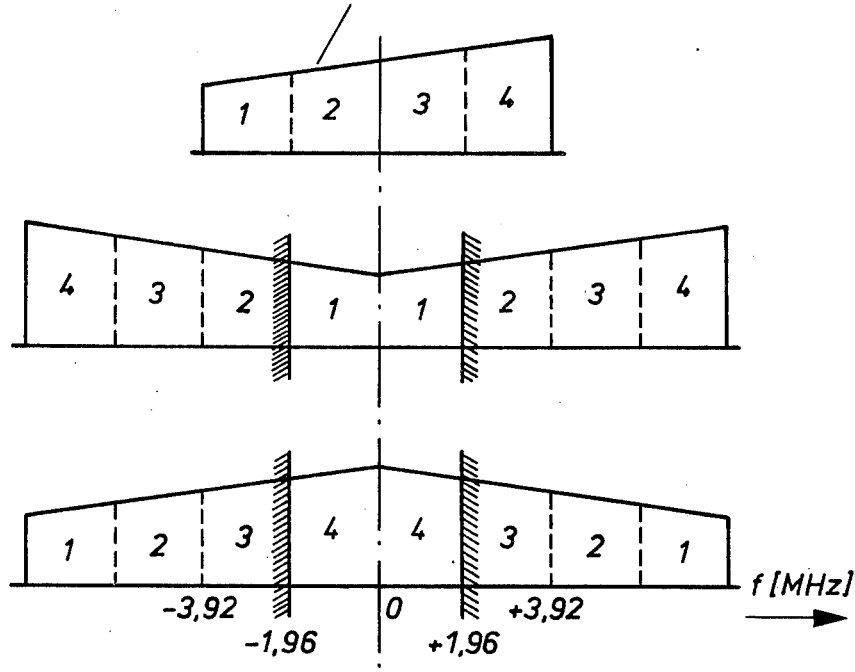
FIG. 7 is a series of diagrams used to explain the operation of a circuit according to the invention.
Figure 7:
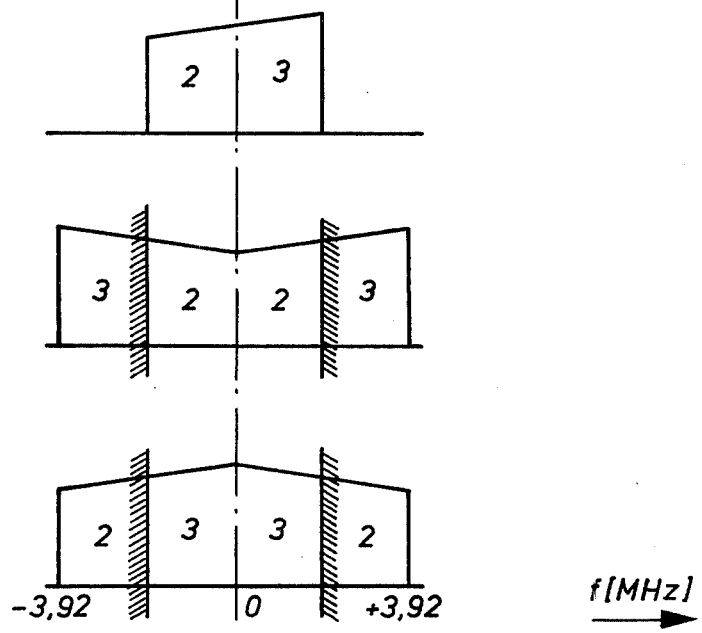

The following circuit combination serves to select one of the four partial bands which are depicted in FIG. 7.

Since the serial signal is present in complex form, i.e., is composed of an in-phase component and a quadrature component, positive and negative frequencies of the spectrum are required. In order to obtain bands 1 and 4, the spectrum is mixed so that it is shifted by $\pm$ 3.92MHz and the real portion is filtered out, as depicted in FIG. 7a at a limit frequency 1.96MHz with lowpass filters 16. For bands 2 and 3, the bandwidth is limited to 3.92MHz before mixing, by switching the two lowpass filters 16 with variable limit frequency connected to the multiplexer outputs to a limit frequency of 1.96MHz. Now the oscillator frequency is 1.96MHz so that one obtains either the band which has been shifted to the right by 1.96MHz or the band which has been shifted to the left by 1.96MHz, as depicted in FIG. 7b.

Lowpass filters 16 with variable limit frequency are connected to the outputs of the multiplexers 8 and 80, followed by modulator 17 for the in-phase component and modulator 170 for the quadrature component. The modulators are controlled in that initially a square wave signal is generated in square wave generator 18 at a frequency of 3.92MHz. This square wave signal, or the square wave signal at frequency 1.96MHz which has been obtained with the aid of frequency divider 19, is utilized, depending on the position of switch 21, to control modulator 17 which processes the in-phase component. This square wave signal is simultaneously fed to a delaying member 22 producing a delay of 125 ns and is then utilized, either directly to correspond to the ranging period index $k$, or inverted with the aid of an inverter 23, to control modulator 170 which processes the quadrature component.

In a summing circuit 24 the in-phase and the quadrature components are summed and pass through a lowpass filter 25 having a limit frequency of 3.92MHz. Then the signal portion passed by filter 25 is multiplied by a phase factor in a device 26, which effects a fast Fourier transformation and multiplication, and is therefore subjected to a fast Fourier transformation.

In the close-range field, the phase factor is $$\exp\left\{j \frac{\pi \cdot f_o}{R \cdot c} n^2 \Delta x^2\right\}.$$

where R is the distance to the target, $\Delta x$ the distance between two transducer elements or groups of transducers, respectively, and $n$ is the index identifying the respective transducer ($n = 1, \ldots, 100$).

In the distant field this factor is approximately 1; it is then not necessary to effect a multiplication. For the given embodiment it will then be necessary to effect a Fourier transformation of 25 input values. The value of the output signal furnishes the echo amplitude from 25 receiving directions which is displayed on a viewing device 27 as an intensity graph.

Figure 6:
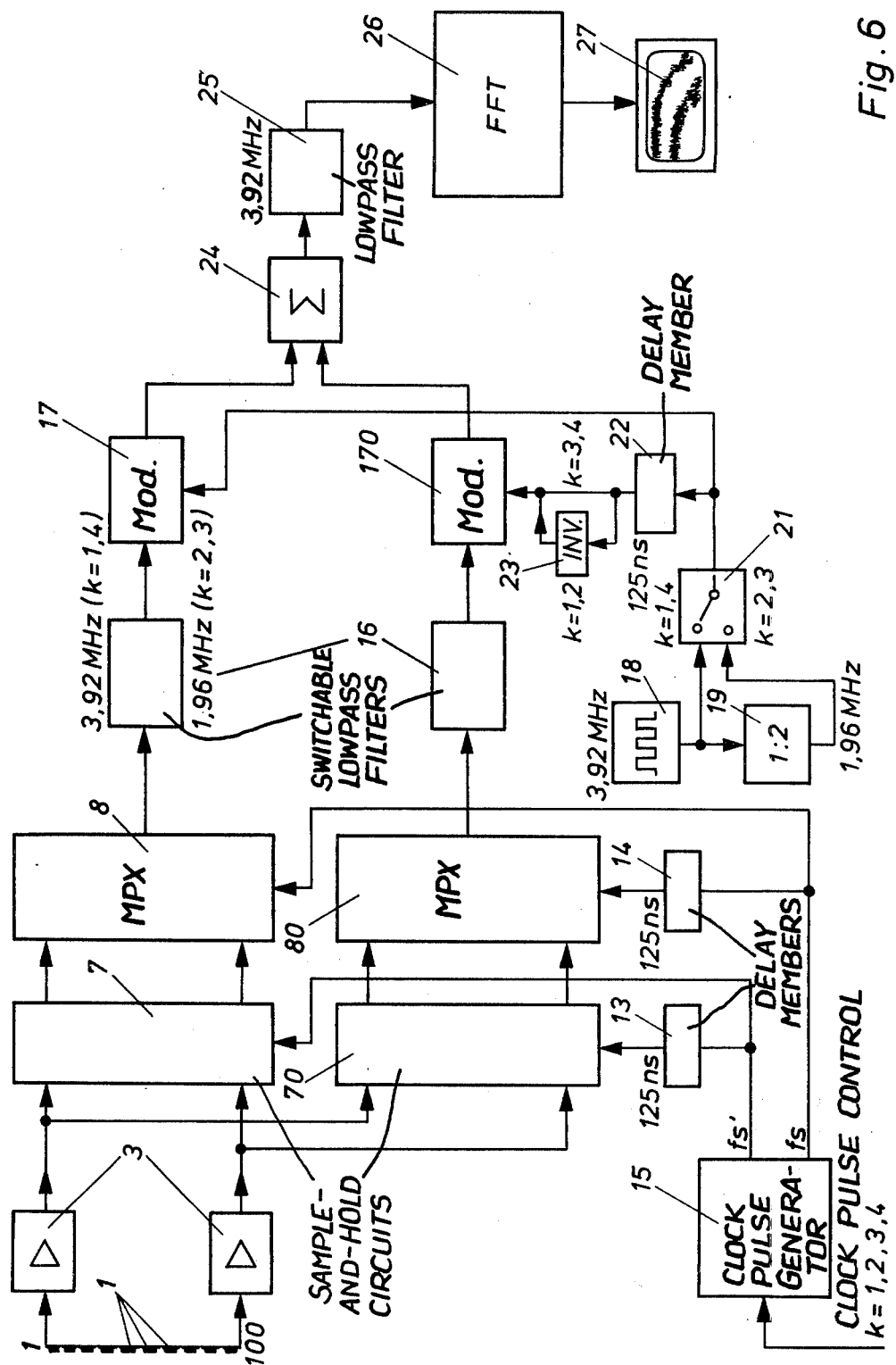
FIG. 6 is a block diagram of one embodiment of a processing circuit according to the invention.
Figure 6A:
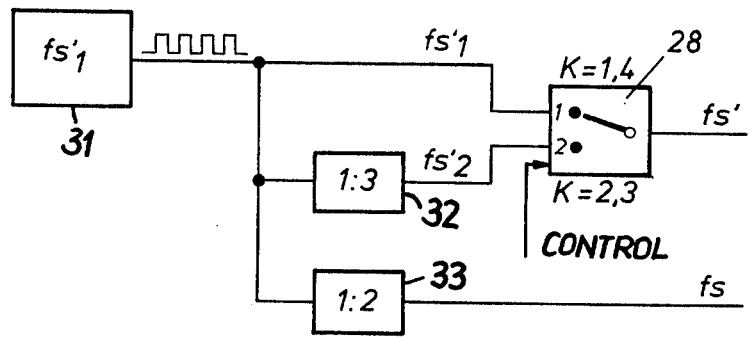
FIG. 6a is a detail view of one embodiment of the clock pulse generator 15 of FIG. 6.

One possible embodiment of the clock pulse generator 15 of the circuit of FIG. 6 is shown in FIG. 6a. This circuit includes a rectangular wave train generator 31 producing rectangular waves at the scanning frequency $f_{s'1}$. The output of generator 31 is connected to the input of two frequency dividers 32 and 33 producing frequency divisions of 1:3 and 1:2, respectively. The output of divider 33 provides pulses at the signal scanning frequency $f_s$. The output of divider 32 produces a pulse train at the lower scanning frequency $f_{s'2}$, and this output is connected to the second input of switch 28. Switch 28 is controlled by successive band, or partial region, pulses in a manner to supply the train of pulses $f_{s'1}$ at the output of the switch during the periods corresponding to bands 2 and 3 and the train of pulses $f_{s'2}$ at the output during the periods corresponding to bands 1 and 4.

The switching between successive bands is arranged to correspond to successive emitted pulse periods, or ping periods, each partial angular region $k$ corresponding to, or being scanned during, a respective ping period. Thus, for a system in which $K = 4$, the entire angular range of the system will be scanned once during each group of four emitted pulses.

Figure 6B:
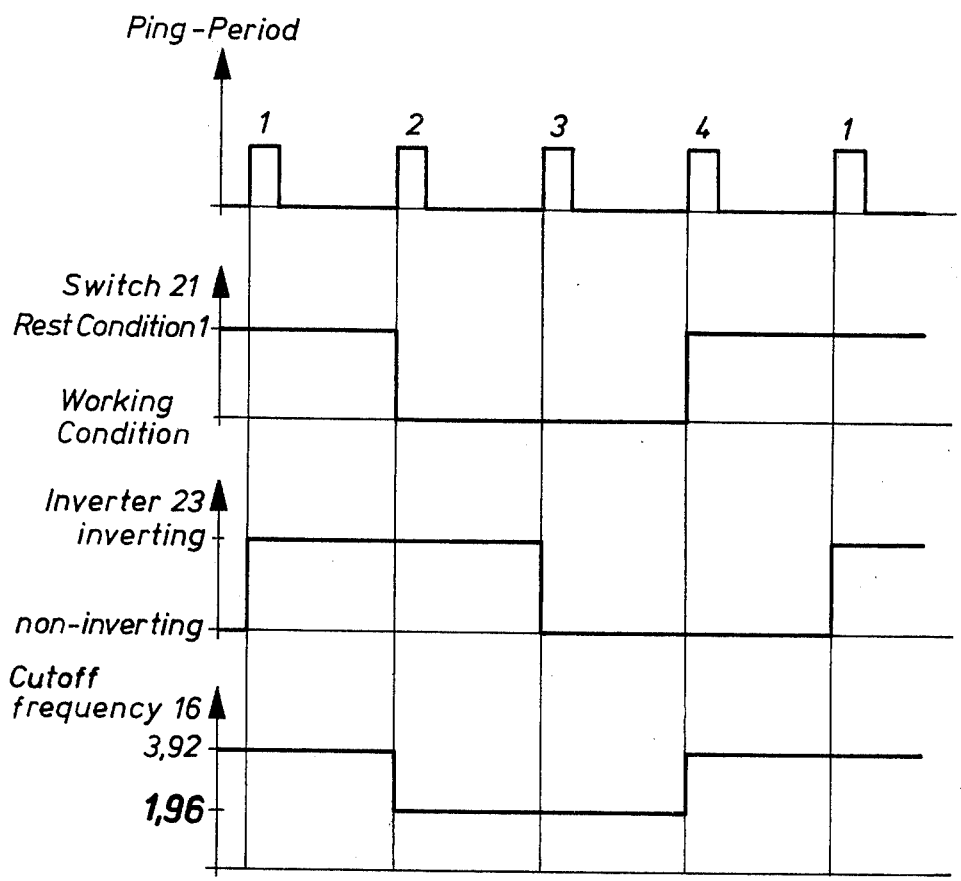
FIG. 6b is a waveform diagram illustrating the operating sequence of switch 21, inverter 23 and filters 16 of FIG. 6.

FIG. 6b depicts the operating pattern of switch 21, inverter 23 and switchable filters 16 during each cycle of four ping periods. During periods, or bands, 1 and 4, switch 21 is in its rest position and filters 16 are switched to have a cutoff frequency of 3.92MHz, while during periods 2 and 3, switch 21 is in its activated position and filters 2 and 3 have a cutoff frequency of 1.96MHz. On the other hand, inverter 23 is effectively connected in series between delay member 22 and modulator 170 during periods 1 and 2, and is deactivated and bypassed during periods 3 and 4.

The sequence of closure of the switches 4 of circuits 7 and 70 (Group $S_I$) during each scanning period $k$ is shown in FIG. 6c, while the sequence in circuits 8 and 80 (Group $S_{II}$) is shown in FIG. 6d.

The total time for scanning all of the switches 4 differs from that for scanning all of the switches 9, as a function of the relation between frequencies $f_s$ and $f_r$. In addition, with respect to FIG. 6c, the switching rate during scanning intervals $k = 1$ and 4 differs from that during scanning periods $k = 2$ and 3. The relations between the scanning rates depicted in FIGS. 6c and 6d correspond to that shown in FIG. 4 for scanning periods $k = 2$ and 3, and to that shown in FIG. 5 for scanning periods $k = 1$ and 4. Thus, FIGS. 6c and 6d are not to the same time scale and FIG. 6c is not to a uniform time scale. However, during each scanning period, k, the switching sequences depicted in FIGS. 6c and 6d commence simultaneously.

Figure 6E:
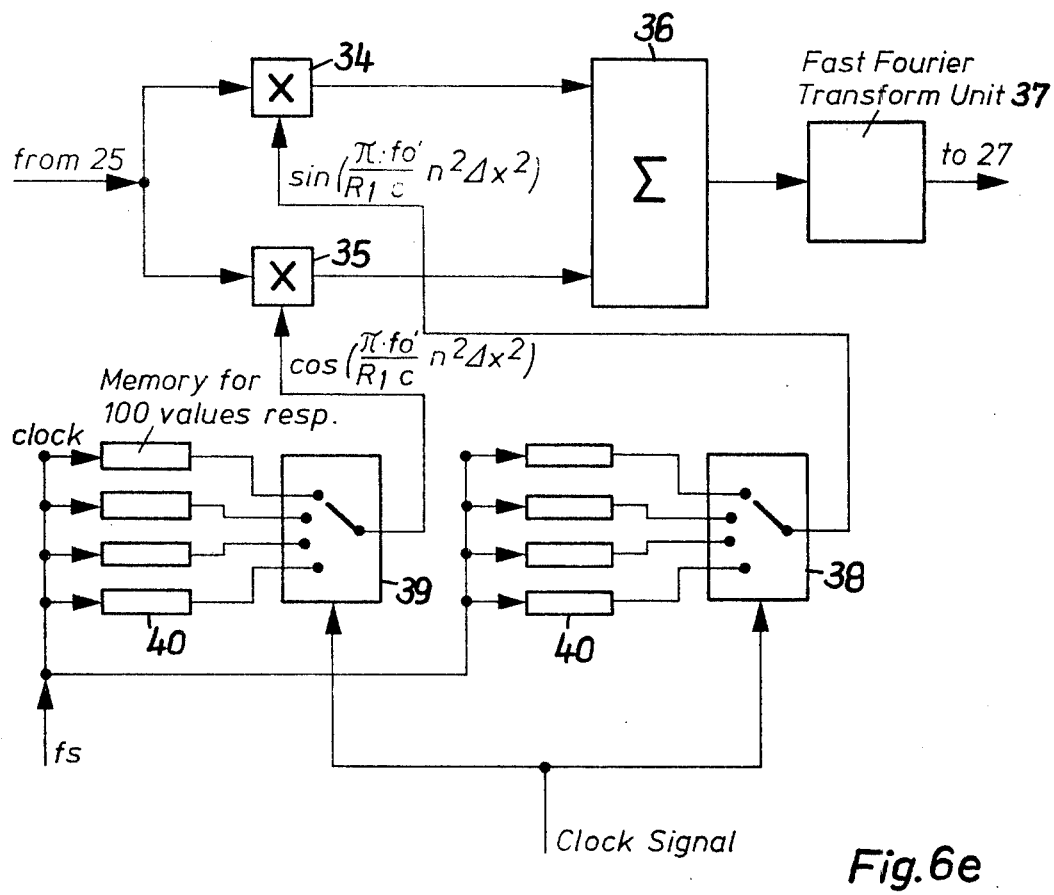
FIG. 6e is a circuit diagram of one embodiment of the device 26 of FIG. 6.
Figure 6F:
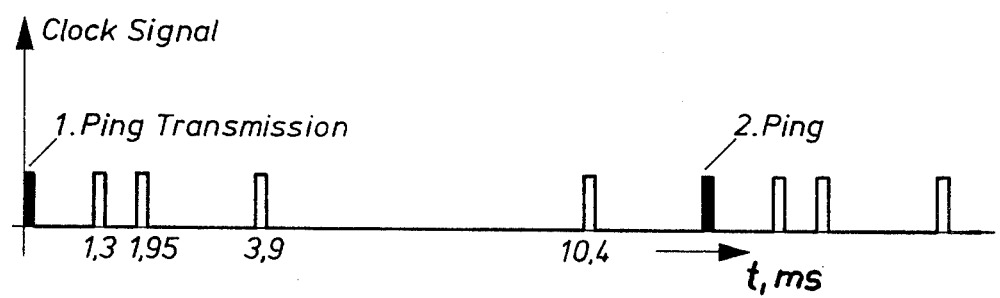
FIG. 6f is a diagram used in explaining the operation of the circuit of FIG. 6e.

FIG. 6e illustrates one embodiment of unit 26 of FIG. 6. This circuit receives its input signal from lowpass filter 25, which signal is supplied to a first input of each of two multipliers 34 and 35. In multiplier 34, the signal supplied to its first input is multiplied by a factor proportional to sin $$\left( \frac{\pi f_{o'}}{R_{n1}c} n^2 \Delta x^2 \right),$$

while the signal at the first input of multiplier 35 is multiplied by a value representing cos $$\left( \frac{\pi f_{o'}}{R_{n1} \cdot c} n^2 \Delta x^2 \right).$$

The index 1 is an integer from 1 to 4 indicating the centre of four different depths of field. The outputs from multipliers 34 and 35 are added together in a summer 36 and the result is supplied to a known Fast Fourier Transform Unit 37. The output from unit 37 is supplied to the display unit 27 of FIG. 6, which can be a PPI (Plan Position Indicator).

In order to derive multiplication factors corresponding to the K partial ranges, the second input of each multiplier is connected to a respective one of the scanning switches 38 and 39. Each of these switches has 4 inputs, each connected to a respective memory having a storage capacity of 100 signal values. Each memory is supplied with a succession of values corresponding to sin $$\left( \frac{\pi f_{o'}}{R_1c} n^2 \Delta x^2 \right)$$

and cos $$\left( \frac{\pi f_{o'}}{R_1c} n^2 \Delta x^2 \right),$$

respectively. Successive values stored in each memory 40 are read out at the stored value scanning frequency $f_s$. Switches 38 and 39 effect a scanning of their inputs under the control of clock pulses synchronized to the four focus ranges.

The Fast Fourier Transform is described by J. W. Cooley and J. W. Tukey, "An algorithm for the machine calculation of complex Fourier series" in Math. of Comput. Vol. 19, pp. 297–301, April 1965, and by J. W. Cooley, P. D. Welch, "What is the FFT" in IEEE Transactions on Audio and Electroacoustics, Vol. Au 15, No. 2, pp. 45–55, June, 1967. These clock signals are not uniformly spaced in time scale as shown in FIG. 6e. The spacings are chosen that way, that the focusing error becomes low.

It will be understood that the above description of the present invention is susceptible to various modifications, changes and adaptations, and the same are intended to be comprehended within the meaning and range of equivalents of the appended claims.

What is claimed is:

1. In a method for determining the direction of echo signal pulses in a medium by means of a close range sonar system having at least one linear array of electroacoustic transducers and presenting a wide aperture angle and high azimuth and radial resolution, the improvement comprising: dividing the total aperture angle into a plurality of partial regions each having a respective median direction and an aperture angle $$\alpha \leq \frac{c}{D \cdot B},$$

where $c$ is the speed of sound in the medium, $D$ is the length of the transducer array, and $B$ is the bandwidth of the emitted signal pulses; subjecting the received signals associated with each partial region to a delay time compensation corresponding to its associated median direction; scanning the signals received by successive units of the transducers of said array at a selected frequency $f_{s'}$; intermediately storing the scanned signals; sampling successive ones of the intermediately stored signals at a sampling frequency $f_s$ to form a serial signal; and phase compensating the resulting serial signal to produce a direction indication.

2. A method as defined in claim 1 wherein, in order to effect delay time compensation for a receiving direction $\beta$, where $$|\beta| \leq \frac{n \cdot c}{D \cdot f_s},$$

with N being the number of transducer units, the frequency $f_s$ is given a value which meets sampling theorem criteria, and frequency $f_{s'}$ is given a value higher than $f_s$.

3. A method as defined in claim 2 wherein, in order to effect delay time compensation for a receiving direction $\beta$, where $$\frac{N \cdot c}{D \cdot f_s} \leq |\beta| \leq \frac{2N \cdot c}{D \cdot f_s},$$

with N being the number of transducer units, said step of scanning is carried out in the sequence $u_n$, $u_{n+M}$, $u_{n+M+1}$ ..., where $u$ is the instantaneous signal amplitude from a transducer unit, $n$ is a number identifying the location of a selected transducer unit and has a value between 1 and N, and M is the next integer to $$N \frac{f_{s'}}{f_s}.$$

4. A method as defined in claim 1 wherein, in order to effect delay time compensation for a receiving direction $\beta$, where $$\frac{N \cdot c}{D \cdot f_s} \leq |\beta| \leq \frac{2N \cdot c}{D \cdot f_s},$$

with N being the number of transducer units, said step of scanning is carried out in the sequence $u_n$, $u_{n+M}$, $u_{n+M+1}$ ..., where $u$ is the instantaneous signal amplitude from a transducer unit, $n$ is a number identifying the location of a selected transducer unit and has a value between 1 and N, and M is the next integer to $$N \frac{f_{s'}}{f_s}.$$

5. A method as defined in claim 4 further comprising, for processing the signals associated with a partial region, subjecting the serial signal to a frequency filtering passes only frequencies $f$ satisfying the relation:

$$\frac{D \cdot f_s \cdot \sin\left(\beta_k - \frac{\alpha}{2}\right)}{\lambda \cdot N} \leq f \leq \frac{D \cdot f_s \cdot \sin\left(\beta_k + \frac{\alpha}{2}\right)}{\lambda \cdot N}$$

where $\lambda$ is the signal wavelength in the medium and $\beta_k$ is the median direction for the partial region.

6. A method as defined in claim 4 wherein the signals associated with individual partial regions are separately processed during successive ranging periods.

7. Apparatus for determining the direction of echo signal pulses in a medium in a close range sonar system having at least one linear array of electroacoustic transducers composed of a plurality of transducer units and presenting a wide aperture angle and high azimuth and radial resolution, said apparatus comprising: a plurality of amplifiers each having an input connected to the electrical output of a respective transducer unit; a first sample-and-hold circuit for the in-phase components of the signals from said transducer units, and a second sample-and-hold circuit for the quadrature components of such signals, each said circuit having a plurality of memory elements, one of each said amplifier, and means selectively connecting each said memory element to its respective amplifier; clock pulse generator means producing a first clock pulse train at a selected frequency $f_{s'}$ and a second clock pulse train at a sampling frequency $f_s$; means connected to apply the first clock pulse train to said first sample-and-hold circuit for causing the memory elements thereof to each receive a signal from its respective amplifier during only a respective successive cycle of the first clock pulse train; first time delay means connected to apply the first clock pulse train to said second sample-and-hold circuit, with a time delay to obtain the quadrature components, for causing the memory elements of said second circuit to each receive a signal from its respective amplifier during only a respective successive cycle of the delayed first clock pulse train; a first multiplexer for the in-phase signal components having a plurality of selectively closeable conductive paths each connected between a respective memory element of said first circuit and a common output; a second multiplexer for the quadrature signal components having a plurality of selectively closeable conductive paths each connected between a respective memory element of said second circuit and a common output; means connected to apply the second clock pulse train to said first multiplexer for closing each conductive path thereof only during a respective successive cycle of the second clock pulse train; second time delay means connected to apply the second clock pulse train to said second multiplexer, with a time delay to obtain the quadrature components, for closing each conductive path of said second multiplexer only during a respective successive cycle of the delayed second clock pulse train; first and second lowpass filters each having a variable limit frequency and each connected to the common output of a respective one of said first and second multiplexers; first and second modulators each having two inputs and an output, said first modulator being connected via one of its inputs to said first lowpass filter and said second modulator being connected via one of its inputs to said second lowpass filter; a square wave generator; a frequency divider connected to the output of said square wave generator; switch means having a first and second input and an output, the first input of said switch means being connected to the output of said square wave generator, the second input of said switch means being connected to the output of said frequency divider, and the output of said switch means being connected to the second input of said first modulator; third time delay means connected to receive the signal at the output of said switch means; means connecting said third time delay means to the second input of said second modulator for selectively applying either the signal at the output of said third delay means or the inverse of that signal to said second input of said second modulator; summing means connected to the outputs of said first and second modulators for summing the output signals therefrom; a third lowpass filter connected to the output of said summing means; signal processing means connected to the output of said third lowpass filter for subjecting the signal at the output of said third filter to a fast Fourier transformation and multiplication by a phase factor; and visual display means connected to the output of said signal processing means.

* * * * *